United States Patent [19]

Bezoari

[11] Patent Number: 4,594,395

[45] Date of Patent: Jun. 10, 1986

[54] PROCESS FOR METALATING HALOGENATED POLYOLEFINS

[75] Inventor: Massimo D. Bezoari, Baton Rouge, La.

[73] Assignee: The Dow Chemical Company, Midland, Mich.

[21] Appl. No.: 711,926

[22] Filed: Mar. 15, 1985

[51] Int. Cl.[4] ............................................... G08F 8/42
[52] U.S. Cl. .................................... 525/334.1; 525/366
[58] Field of Search ............................. 525/334.1, 366

[56] References Cited

U.S. PATENT DOCUMENTS 3,887,533 6/1975 Mukerjee ............................ 525/366
3,978,161 8/1976 Nielsen et al. ...................... 525/366

OTHER PUBLICATIONS

"Chemical Conversions of Halogenated Polyolefines Caused by Organo-Lithium Compounds":, N. A. Plate et al., Vysokomol. soyed. 8: No. 9, pp. 1562–1567, (1966).

"The Role of Chemico-Structural Effects in the Modification of Polymers", N. A. Plate, Vysokomol. soyed. A10: No. 12, pp. 2650–2661 (1968).

"Chemical Transformations and Catalytic Activity of Macromolecular Polylithium Compounds Polymerization", N. A. Plate et al., J. Polymer Sci.: Part C, No. 22, pp. 547–568, (1969).

*Primary Examiner*—Joseph L. Schofer
*Assistant Examiner*—Bernard Lipman
*Attorney, Agent, or Firm*—Dan R. Howard

[57] ABSTRACT

A process for metalating a halogenated polyolefin so that only a very low percentage of the halogen originally present in the halogenated polyolefin is actually reacted during the process. The process comprises adding a solvated transmetalating organometallic compound to a cement mix of a halogenated polyolefin and a solvent. The transmetalating organometallic compound is present in the reaction in a molar amount less than the molar amount of the halogen content of the halogenated polyolefin. The reaction temperature is below 0° C.

15 Claims, No Drawings

PROCESS FOR METALATING HALOGENATED POLYOLEFINS

BACKGROUND OF THE INVENTION

Metalation, especially lithiation, of halogenated polyolefins has long been recognized to yield useful intermediates. These intermediates can be used to produce graft copolymers, functionalized halogenated polyolefins and cross-linked copolymers.

One recognized process for achieving the subject metalation comprises reacting a low molecular weight lithium organic compound and a halide derivative of polyethylene or polypropylene. This reaction can be represented by the following:

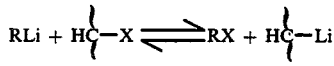

wherein R is a low molecular weight hydrocarbon radical, such as butyl, and X is a halogen, such as Cl. The lithium organic compound is provided in a molar amount about four times the molar content of the halogen in the polyolefin derivative. Th polyolefin derivative is added to the lithium organic compound which is at $-20°$ C. After addition, the temperature of the reaction mix is raised to $50°$ C. to complete the desired reaction. The lithium organic compound is provided in a solvent such as heptane while the polyolefin derivative is solvated in anhydrous tetrahydrofuran for participation in the reaction. It is reported that there are two competing reactions, i.e., the Wurtz reaction and dehydrohalogenation. It is also possible that a third competing reaction, that is, alkylation of the polyolefin derivative, may also occur. These competing reactions are so significant that it is estimated that only about 22% of the halide reacted is replaced by lithium. The use of the large excess of lithium organic compound is reported to be necessary to achieve even this level of metalation. See: "Chemical Conversions of Halogenated Polyolefines Caused by Organo-Lithium Compounds", N. A. Plate et al, Vysokomol. soyed. 8: No. 9, pp. 1562-1567 (1966); "The Role of Chemico-Structural Effects in the Modification of Polymers", N. A. Plate, Vysokomol. soyed. A10: No. 12, pp. 2650-2661 (1968); and "Chemical Transformations and Catalytic Activity of Macromolecular Polylithium Compounds Polymerization", N. A. Plate et al, J. Polymer Sci.: Part C, No. 22, pp. 547-568 (1969).

Due to the competing Wurtz and dehydrohalogenation reactions, the resultant lithiated polymer product is not, strictly speaking, the HC-Li product shown by the above reaction but is rather a lithiated polymer which is cross linked, due to the Wurtz reaction, and has numerous unsaturated sites, due to the dehydrohalogenation reaction. Since an excess of lithium organic compound is used, the percentage of halogen sites involved in cross-linking, dehydrohalogenation and lithiation will be high, i.e., 40% to 70%. The high degree of cross-linking in the lithiated polymer product should evidence itself in the desired final product, be it a graft copolymer or a functionalized halogenated polyolefin, by rendering the final product more brittle and hard. Further, the loss of so many halide sites to dehydrohalogenation and lithiation will change the physical properties of the lithiated polymer product so that it will be more like a polyolefin than a halogenated polyolefin. For example, the elasticity exhibited by a chlorinated polyethylene starting material will be reduced in the more polyethylene-like lithiated polymer product. The greater the number of halogen sites used, the more polyolefin-like will be the lithiated polymer product.

Since a purpose of metalating a halogenated polyolefin is to ultimately yield a graft copolymer or a functionalized polymer having those properties which would be expected to be contributed by the starting halogenated polyolefin, the obtainment of a metalated more polyolefin-like product, due to the required use of an excess of metalating compound, is a definite drawback of this prior art process. Furthermore, the use of an excess of metalating compound also insures the presence, at reaction end, of unreacted metalating compound which, because of its high reactivity, can interfere with subsequent grafting or functionalization procedures. Still another drawback is that the metalating compounds are expensive and thus the required use of an excess of these compounds in the process makes the process less desirable from an economic standpoint.

Therefore, it is an object of the below described invention to provide a process for the metalation of halogenated polyolefins which process uses a metalating compound in a molar amount which is less than the molar amount of the halogen in the halogenated polyolefin and which, as a result, is capable of producing a metalated halogenated polyolefin which has had a low percentage of its halogen sites involved in cross-linking, dehydrohalogenation and metalation.

THE INVENTION

This invention relates to a process for metalating a halogenated polyolefin which comprises adding a solvated transmetalating organometallic compound to a cement mix of a halogenated polyolefin and a solvent, wherein the transmetalating organometallic compound is present in a molar amount less than the molar amount of the halogen content of the halogenated polyolefin. This process occurs under anhydrous conditions and at a temperature within the range of from about $0°$ C. to about $-80°$ C. Halogen utilization by metalation, dehydrohalogenation, cross-linking, etc., is only from about 1 to about 20 percent of the halogen originally present in the halogenated polyolefin. Thus, the metalated halogenated polyolefin maintains most of its original physical properties for contribution to the final graft copolymer or functionalized polymer product. Interestingly, the use of less than a stochiometric amount of solvated transmetalating organometallic compound did not deprive the metalated sites on the polyolefin of their proportional share with regards to the dehydrohalogenation and cross-linkage sites—indeed, the percentage of the total halide reacted which was replaced by the metal was within the range of from about 15 to about 30%. This would not be expected in view of prior art teachings which show that an excess of metalating compound and raised reaction temperatures are needed to drive the before-illustrated metalation reaction to the right. Further, since the process of this invention utilizes most, if not all, of the metalating compound, there is little remaining in the reaction mix to hinder or interfere with subsequent grafting or functionalization procedures.

By halogenated polyolefin, it is meant those polyolefins which are halogenated with chlorine, bromine or iodine. Fluorinated polyolefins are not believed suitable for the process of this invention due to their non-reactivity. The chlorinated and brominated polyolefins are preferred due to their ready availability and stability. Of these two, the chlorinated polyolefins are most preferred as the physical properties which they contribute, even after metalation, to the finally produced graft copolymers and functionalized polymers are highly desirable from a commercial standpoint. The molecular weight and degree of halogenation of the polyolefin are important as they are at least partially determinative of the solubility of the halogenated polyolefin in the solvent to yield the cement mix. High solubility is desired as it insures reactive access to the halogenated polymer chains by the transmetalating organometallic compound. For example, it has been found, for chlorinated polyethylene, that the chlorine content should not exceed 60 weight percent. For best solubility, those chlorinated polyethylene polymers which contain from about 34 to about 45 weight percent chlorine are most highly preferred. For other halogenated polyolefins, the suitability for any particular degree of halogenation can best be determined empirically.

The polyolefin constituent of the halogenated polyolefin can generally be defined as one having an olefin repeating unit containing from about 2 to about 8 carbon atoms and having one or more double bonds. The polyolefin can be a long chain polymer so long as the halogenated polyolefin is soluble in the ether-containing solvent. For example, if the polyolefin is polyethylene, it can have a molecular weight within the range of from about 10,000 to about 750,000 and still be acceptably soluble in the solvent. Suitable polyolefins for the process of this invention are exemplified by polyethylene, polypropylene, polybutylene, polypiperylene, poly(4-methylpentene) and polyoctadiene. Solubility suitability for any particular halogenated polyolefin is best determined by observation of its solubility in the particular solvent at the selected reaction conditions.

The halogenated polyolefins of this invention need not necessarily be homopolymers. Polyolefin copolymers which are subject to halogenation and which are soluble under reaction conditions ma be metalated in accordance with the process of this invention. U.S. Pat. No. 3,454,544, which is incorporated herein by reference, discloses a number of exemplary copolymers suitable for such metalation.

The solvent utilized to dissolve the halogenated polyolefin should be one which is non-reactive towards the transmetalating organometallic compound used in the reaction, is a liquid at reaction temperatures and is anhydrous. Preferred solvents are ether-containing solvents. The ether constituent is preferably tetrahydrofuran, diethylether, 1,2-dimethoxy ethane or methoxy benzene. Generally, the weight percent of halogenated polyolefin in the ether containing solvent will be below about 10 weight percent and preferably within the range of from about 2 to about 5 weight percent, all based on the total weight of the solution.

The transmetalating organometallic compounds used in the process of this invention are those which are capable of transferring a metal ion to the polymer under the process conditions. Due to their recognized transmetalating abilities, alkali metal alkyl compounds are preferred. The preferred alkali metal constituent is lithium. The alkyl constituent can contain up to about 8 carbon atoms and may have a tertiary, secondary or primary bond to the metal. For example, the alkyl constituent can be ethyl, n-butyl, sec-butyl, tert-butyl, methyl, phenyl, allyl, n-octyl, 2-methyl-2-butyl, propyl and the like. The preferred alkyl constituent is n-butyl. The compound, n-butyl lithium, has received wide acceptance in the transmetalation art as a superior reactant and is a preferred reactant for the process of this invention.

The high reactivity and high affinity for vigorous reaction with moisture makes it necessary to provide the transmetalating organometallic compounds to the process of this invention as anhydrous solutions. The solvents used are any of those which are commonly used by the chemical industry for handling such organometallic compounds and which remain a liquid and are non-reactive under process conditions. For example, hexane, pentane, benzene, toluene and various ethers are suitable. The molar concentration of the transmetalating organometallic compound in solution is preferably in the range of from about 1.0 to about 3.0.

The transmetalating reaction of the process of this invention should occur at a temperature below 0° C. and preferably within the range of from about $-5°$ C. to about $-70°$ C. Ambient pressure is suitable. To maintain anhydrous conditions and to prevent unwanted "sport" reactions, the reaction should be carried out under a moisture-free inert atmosphere such as that provided by dry nitrogen or argon.

The relative amounts of the halogenated polyolefin and the transmetalating organometallic compound used for the reaction are an important aspect of the process of this invention. As mentioned previously, the organometallic compound is provided in an amount which is less than stochiometric with respect to the halogen present in the halogenated polyolefin. In a preferred form of this invention, the molar ratio of organometallic to halogen is within the range of from about 1/10 to about 3/10. The molar ratio chosen will be dependent on the extent of metalation desired.

In order that the halogenated polyolefin does not see a stochiometric excess of the transmetalating organometallic compound, it is necessary that the latter be added to the former while the entire reaction mix is continuously blended. Blending of the reaction mix will expedite the homogeneity thereof and can be carried out by mechanical stirring, however, other conventional blending techniques may be used. The rate of addition of the transmetalating organometallic compound is any convenient rate which is in keeping with the capability of the blending method to insure substantial homogeneity of the reaction mix.

The metalated halogenated polyolefins produced by the process of this invention are, as before mentioned, useful in the production of graft polymers and functionalized polymers. Such polymers are produced after the metalating reaction is substantially complete—such completion occurring within ten minutes of the organometallic addition and being indicated by the reaction mix obtaining a dark red/purple color. The grafting or functionalization procedure used can be any of those known to those skilled in the art. See, for example, the before-cited literature by N. A. Plate et al and N. A. Plate. For example, graft copolymers of halogenated polyolefins and electrophilic polymers can be produced by: adding an electrophilic polymer in a solvent, such as tetrahydrofuran, to the metalated halogenated polyolefin; precipitating the resultant product by the further addition of alcohol; and purifying the precipitate with an acetone wash. The reaction temperature is within the range of from about −70° C. to about 50° C. Especially useful graft copolymers are those in which one copolymer moiety is chlorinated polyethylene and the other is polymethylmethacrylate or styrene-acrylonitrile. Functionalization can be carried out by the reaction of the metalated halogenated polyolefin and carbon dioxide, oxalyl chloride, phosphorus oxychloride, sulfuryl chloride, dimethylfulvene, toluene diisocyanate and the like.

The invention is illustrated by the following examples. These examples are given merely for purposes of illustration and are not intended in any way to restrict the scope of the invention nor the manner in which it can be practiced.

The halogenated polyolefins used in the following examples were CPE 3615 and CPE 4211 which are chlorinated polyethylene formulations sold by The Dow Chemical Company, Midland, Mich. 48640. CPE 3615 has a molecular weight of about 750,000 and contains about 36% weight percent chlorine. CPE 4211 has a molecular weight of about 100,000 and contains about 42% weight percent chlorine.

EXAMPLE I

CPE 3615 (1.0 g) was dissolved in 50 mL anhydrous tetrahydrofuran at room temperature, under nitrogen, in a 100 mL RB flask fitted with thermometer, condenser, and nitrogen inlet. The opaque solution was cooled to −30° C. by means of a dry ice/acetone bath. To the cooled solution, 2 mL of a 1.55 M solution of n-butyl lithium in hexane was added dropwise from a syringe. The formation of lithiated CPE was evidenced by the appearance of pink/purple colored complex. Gel formation occurred due to the insolubility of the species.

EXAMPLE II

The procedure of Example I was repeated except that the tetrahydrofuran was cooled to −60° C. before the CPE 3615 was added. It was observed that some portion of the CPE 3615 was not dissolved. After addition of the n-butyl lithium solution, a much fainter pink color was observed indicating that, due to the low solubility of the CPE 3615, fewer reactive sites were available for lithiation.

EXAMPLE III

CPE 4211, (1 g), was dissolved in 45 mL anhydrous tetrahydrofuran in a 100 mL three-neck flask fitted with a mechanical stirrer, $N_2$ inlet and stopper. A dilute solution of butyl lithium (2.7 M in hexane) was added to enough hexane to give 5 mL total. In different runs, the butyl lithium solution was added, dropwise, in varying amounts and under different reaction temperatures as shown in Table 1. Also, before analysis of the reaction product, varying amounts of time were allowed after addition of the butyl lithium solution as is also indicated in Table 1. The weight percent chlorine left unreacted was determined by thermogavimetric analyses on a Perkin-Elmer TGS-II system. The red/purple complex of metalated polymer forms after a brie induction period.

TABLE I

| Run | Temp. (°C.) | Li/Cl % Molar Ratio | Time (min.) | Unreacted Cl As Wt. % of CPE 4211 |
|---|---|---|---|---|
| 1 | −60° | 18 | 2 | 37 |
| 2 | | | 5 | 39 |
| 3 | | | 10 | 38 |
| 4 | | | 10 | 38 |
| 5 | | | 20 | 36 |
| 6 | | | 60 | 36 |
| 7 | −5° | 18 | 2 | 37 |
| 8 | | | 5 | 40 |
| 9 | | | 8 | 36 |
| 10 | −60° | 9 | 2 | 38 |
| 11 | | | 5 | 38 |
| 12 | | | 10 | 39 |
| 13 | | | 20 | 38 |
| 14 | | | 30 | 39 |
| 15 | −60° | 36 | 2 | 38 |
| 16 | | | 5 | 34 |
| 17 | | | 10 | 38 |
| 18 | | | 30 | 42 |
| 19 | | | 40 | 38 |

As can be seen from the results shown in Table 1 only up to about 6 weight percent of the chlorine originally present in the CPE 4211 was lithiated, cross-linked or involved in dehydrochlorination and thus, the lithiated chlorinated polyethylene will maintain, to a high degree, its original physical properties for contribution to a graft copolymer or functionalized polymer.

EXAMPLE IV

To determine the percentage of chlorine sites which are lithiated and, by difference, the percentage of chlorine sites involved in side reactions, the following procedure was followed.

2 g of CPE 4211 were dissolved as extensively as possible in 1 hour in stirred 80–90 mL anhydrous tetrahydrofuran under nitrogen. This solution was immersed in a dry ice/acetone bath until the contents of the flask were at −45° C. Butyl lithium (1.8 mL of 2.6 M solution in hexane, $4.7 \times 10^{-3}$ mole) was added to ca. 5 mL hexane, and added dropwise to the CPE/tetrahydrofuran mixture. The opaque mixture immediately darkened to a red/purple color. After addition was complete (ca. 2 minutes), the reaction was allowed to continue for 4–5 minutes. Addition of a mixture of ethanol, tetrahydrofuran, and water (ca. 1:1:1) caused the reaction mixture to turn to pale yellow, signifying the "quenching" of reactive metalated sites on the CPE polymer. A few drops of phenolphthalein indicator in alcohol solution were added to the reaction vessel, and the mixture became purple, indicating the basicity of the mixture. A standard solution of HCl in $H_2O$ (0.379 M) was added dropwise by means of a buret, until the purple indicator turned clear. The amount of HCl required for neutralization was 2.62 mL ($9.9 \times 10^{-4}$ mole). The amount of butyl lithium remaining in the syringe and bottle was found by washing them in $H_2O$ and titrating the resulting basic $H_2O$ as above. Thus, the amount of butyl lithium remaining in the syringe and bottle was found to be neutralized by 1.0 mL HCl (0.379 M). The amount of butyl lithium actually used in the reaction was therefore (4.7−0.38) millimoles, i.e., 4.30 millimoles. The amount of active lithiated species is found to be $(0.99/4.3) \times 100$ percent of the added butyl lithium, i.e., 23%. The extent of side reactions was therefore 77%.

EXAMPLE V

CPE 4211 lithiated in accordance with the procedure of Example III, run 11, and at about −60° C., had added thereto lumps of dry ice. Mechanical mixing was necessary to insure that the $CO_2$ contacted the lithiated CPE 4211 completely. The resultant product was precipitated by the addition of methanol. The precipitate was rigorously purified by repeatedly dissolving it in methylene chloride and reprecipitating it with methanol. The purified polymer product was prepared into a thin film and analyzed with a Perkin-Elmer 283 IR spectrometer. Absorption bands were found at about 1630 $cm^{-1}$ indicating the presence of —$CO_2Li$ functional groups on the CPE 4211.

I claim:

1. A process for metalating a halogenated polyolefin, which process comprises:
   (a) forming a reaction mixture by adding a first solution of an alkyllithium compound containing from about 2 to about 8 carbon atoms and an inert solvent to a second solution of a halogenated polyolefin and an ether-containing solvent, said compound being added in an amount sufficient to provide a molar ratio of said alkyllithium compound to the halogen in said halogenated polyolefin within the range of from about 0.1:1 and about 0.3:1; and
   (b) maintaining the reaction mixture at a temperature below about 0° C. until said metalation is substantially complete.

2. The process of claim 1 wherein said alkyllithium compound is n-butyllithium and said inert solvent is hexane.

3. The process of claim 1 wherein said alkyllithium compound is n-butyl lithium.

4. The process of claim 1 wherein said halogenated polyolefin is a chlorinated polyolefin.

5. The process of claim 4 wherein said chlorinated polyolefin is chlorinated polyethylene.

6. The process of claim 5 wherein the weight percent of chlorine in said chlorinated polyethylene does not exceed 60 weight percent.

7. The process of claim 3 wherein said halogenated polyolefin is a chlorinated polyolefin.

8. The process of claim 7 wherein said chlorinated polyolefin is chlorinated polyethylene.

9. The process of claim 8 wherein the weight percent of chlorine in said chlorinated polyethylene does not exceed 60 weight percent.

10. The process of claim 1 wherein said temperature is within the range of about 0° to about −80° C.

11. A metalated halogenated polyolefin in which the olefin in each polymer unit contains from about 2 to about 8 carbon atoms and in which said metalated halogenated polyolefin is produced by the steps of:
    (a) forming a reaction mixture by adding a first solution of an alkyllithium compound containing from about 2 to about 8 carbon atoms and an insert solvent to a second solution of a halogenated polyolefin and an ether-containing solvent, said component being added in an amount sufficient to provide a molar ratio of said alkyllithium compound to the halogen in said halogenated polyolefin within the range of from about 0.1:1 and about 0.3:1; and
    (b) maintaining the reaction mixture at a temperature below about 0° C. until said metalation is substantially complete.

12. The metalated halogenated polyolefin of claim 11 wherein the halogen constituent is chlorine.

13. The metalated halogenated polyolefin of claim 12 wherein the polyolefin constituent is polyethylene.

14. The metalated halogenated polyolefin of claim 11 wherein said alkyllithium compound is n-butyllithium.

15. The metalated halogenated polyolefin of claim 14 wherein the halogenated poloylefin is chlorinated polyethylene.

* * * * *